Jan. 30, 1968     A. L. THOMPSON ETAL     3,366,414
TRUCK BED COVER APPARATUS
Filed Aug. 22, 1966
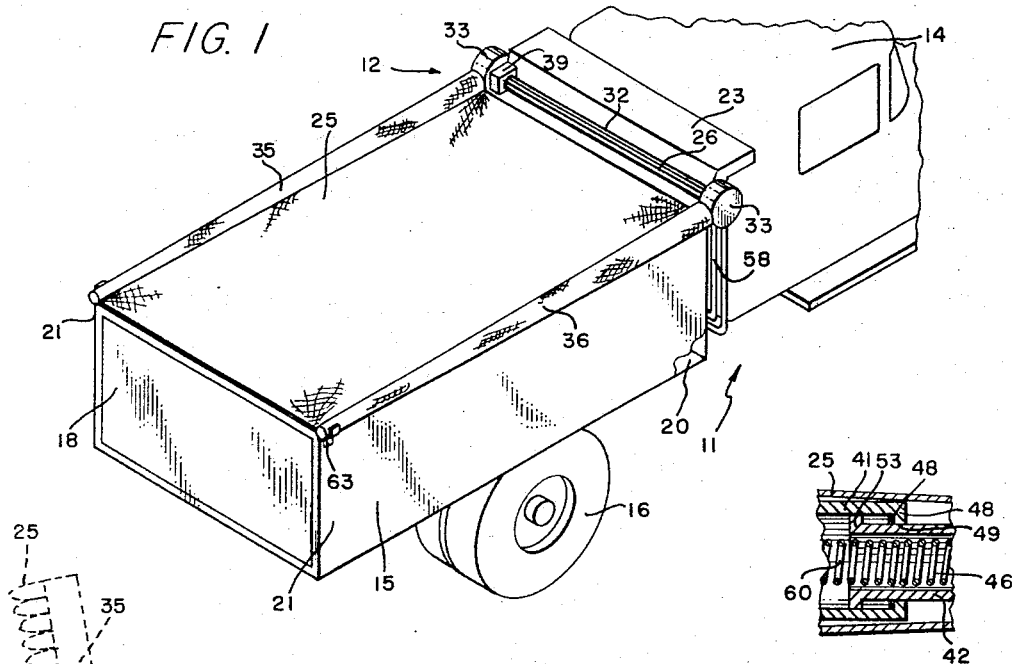
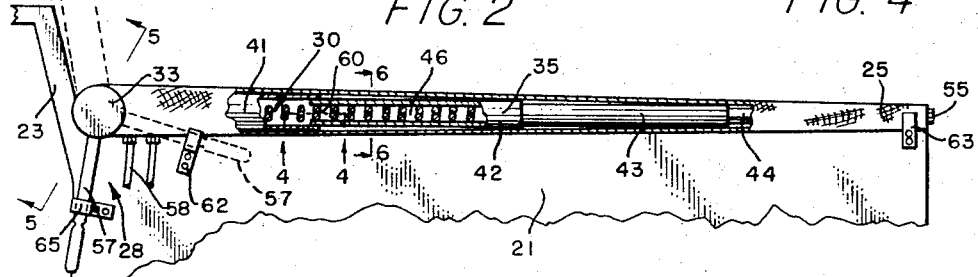
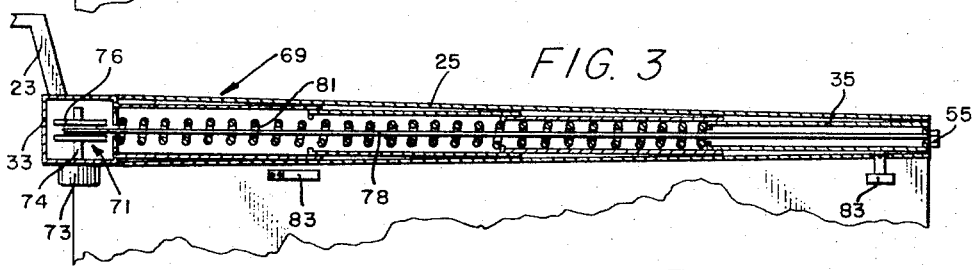
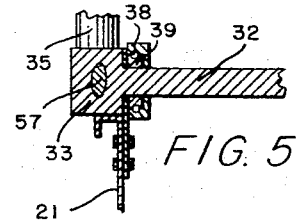
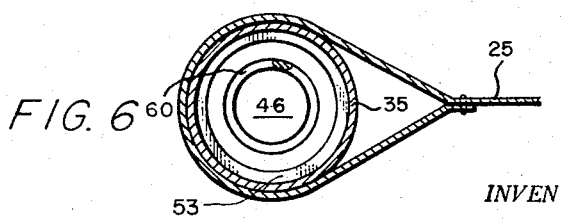
INVENTORS
CLARENCE L. GILE
ANDY L. THOMPSON
BY
*John H. Wilderman*
*Phillip A. Rein*
ATTORNEYS United States Patent Office 3,366,414
Patented Jan. 30, 1968

3,366,414
TRUCK BED COVER APPARATUS
Andy L. Thompson, R.R. 2, Courtland, Kans. 66939, and Clarence L. Gile, Box 7, Scandia, Kans. 66966
Filed Aug. 22, 1966, Ser. No. 573,941
6 Claims. (Cl. 296—100)

This invention relates to covers for vehicles, and more particularly, to a retractable cover for truck beds. Still, more specifically, this invention relates to a power actuated retractable cover operable to selectively shield the upper open top portion of a truck bed.

Numerous types of covering mechanisms for the use in overlaying the open tops of truck beds are known to the prior art. These prior art devices providing for a power means to activate a cover or tarpaulin member are structurally complicated requiring a plurality of movable parts and are, therefore, subject to maintenance problems. In the use of truck bed covers, it is important that the structure be extremely simple to use and maintenance free as the normal truck operator would tend not to repair the truck bed cover if such would be burdensome but would rather merely stop the use thereof. However, the continued use of a given truck bed cover structure is extremely important in preventing the loss of cargo carried in the truck bed and resultant damage to trailing vehicles resulting possibly in accidents with loss of life and property.

In preferred specific embodiments to the invention, a retractable cover apparatus for a conventional opened top truck bed includes a frame means connected to the forward portion of the truck bed. The frame means has a shaft member rotatably mounted in bearing assemblies secured to the truck bed and outer ends of the shaft member secured to rearwardly extended, parallel, support rails or arms. A canvas or tarpaulin cover member is mounted about the support arms and extended therebetween to effectively cover the entire open top area of the truck bed. At the forward end of the support arm on the truck operator's side is connected an actuator lever operable to rotate the shaft, support arms, and interconnected canvas cover from a first horizontal overlaying position covering the truck bed to a second open loading or unloading position extended upwardly therefrom. A latch means secured to the truck bed is operable to hold the frame means in either the first or second positions. The support arms are comprised of a plurality of telescoping elements movable into a nesting engagement with adjacent ones when not used to cover the truck bed. A hydraulic power means connected to the frame means is usable to extend the support arms and retraction thereof is accomplished by a tension spring member. On retraction of the support arms, the actuator lever is operable to rotate the support arms to the upright position so as to not interfere during loading and unloading of the truck bed.

In another preferred embodiment of the invention, a power means including an electrical motor operable to rotate a pulley having one end of a cable attached thereto and the other end secured to the outer ends of the support arms is usable to retract the support arms. A compression spring mounted within the telescoping elements operates to extend the support arms for usage as a truck bed cover.

Accordingly, it is an object of this invention to provide a retractable cover apparatus overcoming the abovementioned disadvantages of the prior art devices.

Another object of this invention is to provide a retractable cover apparatus having a canvas cover mounted on a pair of telescoping support arms movable to shield a given area.

A further object of this invention is to provide a retractable cover apparatus that is readily actuated to a retracted, compact structure so as not to impair access to the area to be covered.

Still another object of this invention is to provide a retractable cover apparatus having a canvas cover member mounted on elongated support arms operable to overlay an opened top truck bed, and a latch means operable to secure the apparatus in the overlaying and the retracted positions, respectively.

One further object of this invention is to provide a retractable cover apparatus having telescoping support arms and a power means operable under conventional truck hydraulic pressure to extend the support arms for usage as a truck bed cover.

A still further object of this invention is to provide a retractable cover apparatus having a cover member mounted on telescoping support arms, an electrical power means operable to retract the support arms, and spring means to extend the support arms to overlay a given area.

One other object of this invention is to provide a retractable cover apparatus that is inexpensive to manufacture, simple to operate, easy to install on conventional truck beds, and substantially maintenance free.

Various other objects, advantages and features of the invention will become apparent to those skilled in the art from the following discussion taken in conjunction with the accompanying drawings, in which:

FIG. 1 is a fragmentary perspective view of a conventional truck having a preferred specific embodiment of the cover apparatus of this invention secured thereto for covering an opened top truck bed;

FIG. 2 is an enlarged fragmentary side elevational view of same having the retracted position thereof shown in dotted lines and portions broken away for clarity;

FIG. 3 is an enlarged fragmentary side elevational view of a second preferred specific embodiment of the retractable cover apparatus of this invention having portions broken away for clarity;

FIG. 4 is an enlarged fragmentary sectional view taken along line 4—4 in FIG. 2;

FIG. 5 is a fragmentary sectional view taken along lines 5—5 of FIG. 2; and

FIG. 6 is an enlarged sectional view taken along lines 6—6 of FIG. 3.

The following is a discussion and description of preferred specific embodiments of the retractable cover apparatus of this invention, such being made with reference to the drawings, whereupon the same reference numerals are used to indicate the same or similar parts and/or structures. It is to be understood that such discussion and description and drawings are not to unduly limit the scope of the invention.

Referring to the drawings in detail and in particular to FIG. 1, a standard dump type truck is illustrated, indicated generally at 11, having the retractable cover apparatus 12 of this invention connected thereto. The truck 11 has an operator's cab 14 connected to a rearwardly extended bed 15 supported on rear wheels 16. This particular truck 11 is normally used to haul sand, gravel and the like with a hydraulically actuated lift cylinder (not shown) operable to elevate the forward end of the bed to discharge contents contained therein through a rear gate member 18. The truck bed 15 is of a box shape defined by a bottom wall 20, parallel sidewalls 21, a head plate or forward wall 23, and the gate member 18 having an open upper top portion for loading purposes.

In one embodiment of the invention, the retractable cover apparatus 12 includes a tarpaulin or canvas cover 25 connected to a frame means 26, which in turn, is pivotally connected to the head plate 23 of the truck bed 15; an actuator or lever means 28 operable to pivot the frame means 26; and a power means 30 connected to the frame means 26 operable to extend and retract the same as will be explained. More particularly, the frame means 26 has an elongated shaft 32 with enlarged outer end sections 33 to which are secured support arms 35 and 36, respectively. The shaft 32 is rotatably carrying bearing members 38 mounted on plates 38 secured as by bolts to the head plate 23 of the truck bed 15. The support arms 35 and 36 are respectively secured as by welding to the end sections 33 and extended rearwardly, parallel to each other and substantially perpendicular to the shaft 32. It is seen that the support arms 35 and 36 are positioned adjacent and outwardly of the respective sidewalls 21 and of a length slightly longer than the length of the truck bed 15 so that the canvas cover 25 will completely overlay the upper open area of the truck bed 15.

As the support arms 35 and 36 are substantially identical, only one need be described in detail. As shown in FIG. 2, the support arm 35 has a plurality of telescoping elements 41, 42, 43 and 44 movable into nesting engagement with an adjacent one thereof. The elements are of a tubular shape having element 41 secured to the end section 33 and the outer end of element 44 is sealed to form a fluid passageway 46 within the support arm 35. The rearward end of the elements 41, 42 and 43 are formed within inwardly radially extended lips 48 forming openings 49 adapted to receive an adjacent respective one of the elements 42, 43, and 44 in sliding engagement. A seal member 51 is mounted adjacent each lip 48 to prevent fluid leakage from the passageway 46. The forward ends of the elements 42, 43 and 44 are formed with laterally extended flanges 53 adapted to slidably engage the inner surfaces of the elements 41, 42, and 43, respectively. It is seen, therefore, that the elements are movable into nesting telescoping engagement with an adjacent element having contact between the adjacent flanges 53 and lips 51 in the fully extended position. The flanges 53 and lips 51 also cooperate to maintain the support arms 35 and 36 in substantially axial alignment.

The tarpaulin or canvas cover 25 is secured at the forward edge as by bolts or the like to the shaft 32 and the outer parallel side sections thereof are mounted about the support arms 35 and 36 in loop type engagement (FIG. 6). The rearward outermost ends of the canvas cover 25 are secured as by bolts 55 to the end surface of the elements 44. It is seen, therefore, that the canvas cover 25 is adapted to completely overlay the open area of the truck bed 15 and is movable into a folding relationship, as shown by the dotted lines in FIG. 2, when the support arms 35 and 36 are actuated into the retracted position as will be explained.

As shown in FIG. 2, the lever means 28 includes a handle member 57 secured to the end section 33 of the support arm 35 on the driver's side of the truck 11. The handle member 57 is preferably positioned downwardly at an obtuse angle relative to the support arm 35 for reasons to become obvious.

The power means 30 has a fluid pump and reservoir (not shown) conventionally found on commercial truck vehicles connected through lines 58 to the forward elements 41. A control valve (not shown) is operable in one position to supply fluid under pressure through the lines 58 and in a second position to permit drainage of fluid within the support arms 35 and 36 to the reservoir. When pressure fluid is supplied to the support arms 35 and 36, the fluid acts against the sealed outer ends of the elements 44 to fully extend the cover apparatus 12. When the control valve is actuated to open the lines 58 to the reservoir, elongated tension springs 60 secured to opposite inner ends of each support arm 35 and 36, respectively, operate to pull the elements 41, 42, 43 and 44 into telescoping engagement as shown in dotted lines in FIG. 2. This forces the fluid out of the support arms 35 and 36 into the reservoir and retracts the canvas cover 25 permittting access into the truck bed 15.

In the use and operation of the retractable cover apparatus 12 of this invention, the support arms 35 and 36 are held in the telescoping retracted position by the tension springs 60 and the handle member 57 is rotated counterclockwise as viewed in FIG. 2 to extend the support arms 35 and 36 upwardly and forwardly. The handle member 57 may be releasably secured to a clamp 62 mounted on the sidewall 21 of the truck bed 15 to hold the retractable cover apparatus 12 in this position for ease of loading and unloading or traveling without a load. On loading the truck bed 15, the handle member 57 is rotated clockwise, as viewed in FIG. 2, to place the support arms 35 and 36 in a substantially horizontal position and extended under hydraulic pressure by actuation of the control valve (not shown). The outer ends of the elements 44 are engageable with bracket members 63, respectively, secured to the sidewalls 21 to add vertical stability to the retractable cover apparatus 12. Concurrently, the handle member 57 is engageable with a lock clamp 65 on the adjacent sidewall 21 to hold the frame means 26 in this covering position. It is seen that the canvas cover 25 extends outwardly of the periphery of the truck bed 15 to prevent cargo therein such as gravel, sand, and the like from becoming dislodged due to wind, vibrations, or jarring, and endangering other vehicles in the vicinity.

In a second preferred embodiment of the retractable cover apparatus of this invention, indicated generally at 69, the frame means 26, lever means 28, and canvas cover 25 remain unchanged with another power means 71 being used. As shown in FIG. 3, the power means 71 includes an electric motor 73 secured to each end section 33 of the support arms 35 and 36 having a driven shaft 74 secured to a pulley 76. A cable 78 is mounted within each support arm 35 and 36 having one end secured to each pulley 76 and the other end secured to the outer end of the elements 44. Contained within the support arms 35 and 36 are elongated compression spring members 81 having opposite ends in contact with respective outer ends of the support arms 35 and 36.

In the use and operation of the retractable cover apparatus 69, the support arms 35 and 36 are movable into the extended position of FIG. 3 under the force of the compresion spring members 81 in a manner similar to that as previously described for the first retractable cover apparatus 12 in overlaying the truck bed 15. In order to retract the support arms 35 and 36 for access to the truck bed 15, the motors 73 are energized to wind up the cables 78 on the pulleys 76 moving the elements into telescoping or nesting engagement. A latch member 83 secured to each of the support arms 35 and 36 is operable to lock the same in the retracted position. It is obvious that the handle member 57 on the retractable cover apparatus is engageable with the lock clamp 65 and the clamp 62 to hold the frame means 26 in the horizontally extended or the upright positions, respectively.

The retractable cover apparatus of this invention presents a compact, sturdy, simple to use structure that is effective and efficient in operation. The cover apparatus is economical to manufacture and substantially maintenance free thereby assuring continuous usage by the truck operator so as to result in greater safety on the highways and savings in property and lives which are normally lost due to damage from dislodged cargo.

As will be apparent from the foregoing descriptions of the preferred embodiments of applicants' retractable cover apparatus, relatively simple and inexpensive cover means has been provided which is readily attachable to standard truck beds so as to provide an economical, efficient means of covering an opened top truck bed to prevent the contents therein from becoming dislodged. Applicants' construction eliminates a great deal of timeconsuming and tedious work involved in covering the cargo in a truck bed and its simple operation assures usage thereof by the truck operator.

While the invention has been described in connection with preferred specific embodiments thereof, it will be understood that this invention is intended to illustrate and not to limit the scope of the invention, which is defined by the following claims.

We claim:
1. A cover assembly for a vehicle bed having an open top comprising:
 (a) frame means pivotally connected to the bed having rearwardly extended support arms,
 (b) cover means connected to said support arms adapted to cover the open top of the bed,
 (c) actuator means secured to said frame means operable to selectively move said cover means from a substantially horizontal position covering the open top to a substantially upright position permitting loading and unloading of the bed, and
 (d) latch means engagable with said actuator means to releasably secure said cover means in the horizontal or upright positions,
 (e) said support arms having a plurality of telescoping elements movable into nesting engagement with an adjacent one thereof, and
 (f) said cover means secured to opposite ends of said support arms wherein said support arms are movable into nesting engagement to retract said cover means from the bed for loading and unloading purposes.

2. A cover assembly as described in claim 1, wherein:
 (a) said frame means having bearing members secured to the bed and a rotatable shaft mounted therein,
 (b) said support arms secured to outer ends, respectively, of said shaft movable therewith, and
 (c) said actuator means secured to one end of said shaft and operable to pivot said cover means relative to the bed.

3. A cover assembly as described in claim 1, including:
 (a) power means connected to said frame means operable to extend said telescoping elements, and
 (b) spring means mounted on said support arms operable to retract said telescoping elements to uncover the bed.

4. A cover assembly as described in claim 3 wherein:
 (a) said power means having hydraulic lines connected to said support arms, a pressure supply means operable to supply pressure to said lines to extend said telescoping elements, and a reservoir means connected to said lines to receive exhaust fluid on retraction of said elements by said spring means.

5. A cover assembly as described in claim 1, including:
 (a) power means connected to said frame means having a motor, a rotatable pulley connected to said motor, and a line member connected to said pulley and the outermost one of said telescoping elements operable to retract said elements into nesting engagement, and
 (b) spring means mounted on said support arms operable to extend said telescoping arms to cover the bed.

6. A cover assembly as described in claim 5, wherein:
 (a) said spring means of a compression type having opposite ends engageable with the outer ones of said telescoping elements to bias the same in the extended position.

References Cited

UNITED STATES PATENTS

| 2,967,567 | 1/1961 | Heckerman | 160—62 |
| 722,873 | 3/1903 | Mutch | 105—377 |

FOREIGN PATENTS

| 621,743 | 6/1961 | Canada. |

BENJAMIN HERSH, *Primary Examiner.*

P. GOODMAN, *Assistant Examiner.*